US008171527B2

(12) United States Patent
Qiu et al.

(10) Patent No.: US 8,171,527 B2
(45) Date of Patent: May 1, 2012

(54) METHOD AND APPARATUS FOR SECURING UNLOCK PASSWORD GENERATION AND DISTRIBUTION

(75) Inventors: Xin Qiu, San Diego, CA (US); Liqiang Chen, San Diego, CA (US); Stuart P. Moskovics, San Diego, CA (US); Kent D. Rager, Gurnee, IL (US)

(73) Assignee: General Instrument Corporation, Horsham, PA (US)

( * ) Notice: Subject to any disclaimer, the term of this patent is extended or adjusted under 35 U.S.C. 154(b) by 1094 days.

(21) Appl. No.: 11/768,523

(22) Filed: Jun. 26, 2007

(65) Prior Publication Data

US 2009/0006852 A1    Jan. 1, 2009

(51) Int. Cl.
*H04L 29/06* (2006.01)
(52) U.S. Cl. ............ 726/3; 713/168; 713/176; 380/247; 380/249; 455/410; 455/411
(58) Field of Classification Search .......... 455/410–411; 726/3
See application file for complete search history.

(56) References Cited

U.S. PATENT DOCUMENTS

| 7,886,355 | B2 | 2/2011 | Rager et al. | |
|---|---|---|---|---|
| 2002/0069179 | A1* | 6/2002 | Slater et al. | 705/67 |
| 2004/0192388 | A1* | 9/2004 | Dupuis et al. | 455/558 |
| 2005/0045717 | A1 | 3/2005 | Rager et al. | |
| 2005/0138390 | A1 | 6/2005 | Adams et al. | |
| 2005/0149737 | A1* | 7/2005 | Driscoll | 713/182 |
| 2005/0172117 | A1* | 8/2005 | Aura | 713/155 |
| 2006/0236111 | A1 | 10/2006 | Bodensjo et al. | |
| 2007/0050622 | A1 | 3/2007 | Rager et al. | |
| 2008/0117889 | A1* | 5/2008 | Moitrel et al. | 370/345 |
| 2008/0125084 | A1* | 5/2008 | Cambois et al. | 455/411 |
| 2008/0125094 | A1* | 5/2008 | Heurtaux et al. | 455/411 |

OTHER PUBLICATIONS

Ashkenazi et al., "Platform independent overall security architecture in multi-processor system-on-chip integrated circuits for use in mobile phones and handheld devices", 2007, pp. 407-424.*
PCT Search Report & Written Opinion, RE: Application #PCT/US08/67979; Nov. 10, 2008.

* cited by examiner

*Primary Examiner* — Taghi Arani
*Assistant Examiner* — Thaddeus Plecha
(74) *Attorney, Agent, or Firm* — Stewart M. Wiener (57) ABSTRACT

A process may be utilized for securing unlock password generation and distribution. A first set of exclusive responsibilities, assigned to a trusted authority, includes random generation and encryption of an unlock password to compose a randomly generated encrypted unlock password. Further, a second set of exclusive responsibilities, assigned to a security agent, includes sending information associated with the unlock password and a digital signature of information associated with the unlock password to a communication device configured for a network in order to mate the unlock password to the communication device, and sending the randomly generated and encrypted unlock password along with mating data to a password processing center. In addition, a third set of exclusive responsibilities, assigned to a password processing center, includes decrypting the randomly generated and encrypted unlock password.

22 Claims, 9 Drawing Sheets

METHOD AND APPARATUS FOR SECURING UNLOCK PASSWORD GENERATION AND DISTRIBUTION

BACKGROUND

1. Field

This disclosure generally relates to the field of communication devices. More particularly, the disclosure relates to security for communication devices.

2. General Background

Communication devices may include mobile devices, set top boxes, cable modems, and the like. For illustrative purposes, an example utilizing a mobile device is discussed. However, the security issues addressed herein may be pertinent to other types of communication devices.

Many mobile devices are generally locked to accept only a particular kind of Subscriber Identity Module ("SIM") card. A mobile device may be locked to accept only SIM cards from a particular network. Accordingly, an unlock password is needed to unlock a particular mobile device to allow the mobile device to accept other SIM cards not meeting the specific lock criteria.

The process of locking a mobile device to a particular network begins during manufacturing at a factory. A factory server application generates unlock passwords for each of the mobile devices. Subsequently, the factory server application sends the unlock passwords to a plurality of device provision stations. Further, at each of the device provision stations, one or more devices may be connected for provisioning to receive a password message. The factory server application also uploads the unlock passwords to a centralized password processing center ("PPC"). The PPC is the primary repository for a mobile device's attributes, e.g., subsidy locks, unlock passwords, and unique device identifier, etc. Further, the PPC is the primary mechanism that a service center utilizes to retrieve an unlock password to place a mobile device in a state in which the mobile device may be repaired or unlocked so that the mobile device may be operated on the network of a different carrier.

There are configurations that currently do not protect the unlock passwords within the factory server application, device provision station, or PPC. As a result, the unlock passwords for mobile devices are generated, stored, and distributed in an insecure manner. Accordingly, attackers have obtained unauthorized access to the unlock passwords.

SUMMARY

In one aspect of the disclosure, a process may be utilized for securing unlock password generation. The process assigns a first set of exclusive responsibilities to a trusted authority. The first set of exclusive responsibilities includes random generation, encryption, and digital signing of an unlock password to compose a randomly generated and encrypted unlock password having a digital signature. Further, the process assigns a second set of exclusive responsibility to a security agent. The second set of exclusive responsibilities includes receiving the randomly generated and encrypted unlock password with a first digital signature from the trusted authority, digitally signing information associated with the unlock password with a second digital signature, sending the second digital signature and the information associated with the unlock password digital signature and information associated with the unlock password to a communication device configured for a network in order to mate the unlock password to the communication device, and sending the randomly generated and encrypted unlock password having the first digital signature along with mating data to a password processing center. In addition, the process assigns a third set of exclusive responsibilities to the password processing center. The third set of exclusive responsibilities includes, upon receipt of a request for the unlock password, verifying the first digital signature, decrypting the randomly generated and encrypted unlock password, and verifying, based upon the mating data, that the unlock password is mated to the communication device.

In another aspect of the disclosure, the first set of exclusive responsibilities includes random generation and encryption of an unlock password to compose a randomly generated encrypted unlock password. Further, the second set of exclusive responsibilities includes sending information associated with the unlock password and a digital signature of information associated with the unlock password to a communication device configured for a network in order to mate the unlock password to the communication device, and sending the randomly generated and encrypted unlock password along with mating data to a password processing center. In addition, the third set of exclusive responsibilities includes decrypting the randomly generated and encrypted unlock password.

In yet another aspect of the disclosure, another process may be utilized for securing unlock password generation. The process assigns a first set of exclusive responsibilities to a security agent. The first set of exclusive responsibilities includes random generation, encryption, and digital signing of an unlock password to compose a randomly generated and encrypted unlock password having a digital signature, sending the digital signature and information associated with the unlock password to a communication device configured for a network in order to mate the unlock password to the communication device, and sending the randomly generated and encrypted unlock password having the digital signature along with mating data to a password processing center. Further, the process assigns a second set of exclusive responsibilities to the password processing center. The second set of exclusive responsibilities includes, upon receipt of a request for the unlock password, verifying the digital signature, decrypting the randomly generated and encrypted unlock password, and verifying, based upon the mating data, that the unlock password is mated to the communication device.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A method and apparatus are disclosed, which provide secure unlock password generation and distribution. An unlock password may be encrypted when stored within a database or when transmitted from one system to another. Further, unlock password records may be authenticated when the unlock password is transmitted from one system to another to ensure that the unlock password originated from the expected system. In addition, a randomly generated unlock password is utilized for and linked to a specific device when the device is provisioned at a factory. Accordingly, after being provisioned to a device, the unlock password for that device is not utilized by any other device. In addition, system performance with additional security introduced is minimally diminished by carefully arranging the keys in the configurations herein into existing systems. Further, the configurations that are described in FIGS. 4-6 have no production impact on the factory system.

Figure 1:
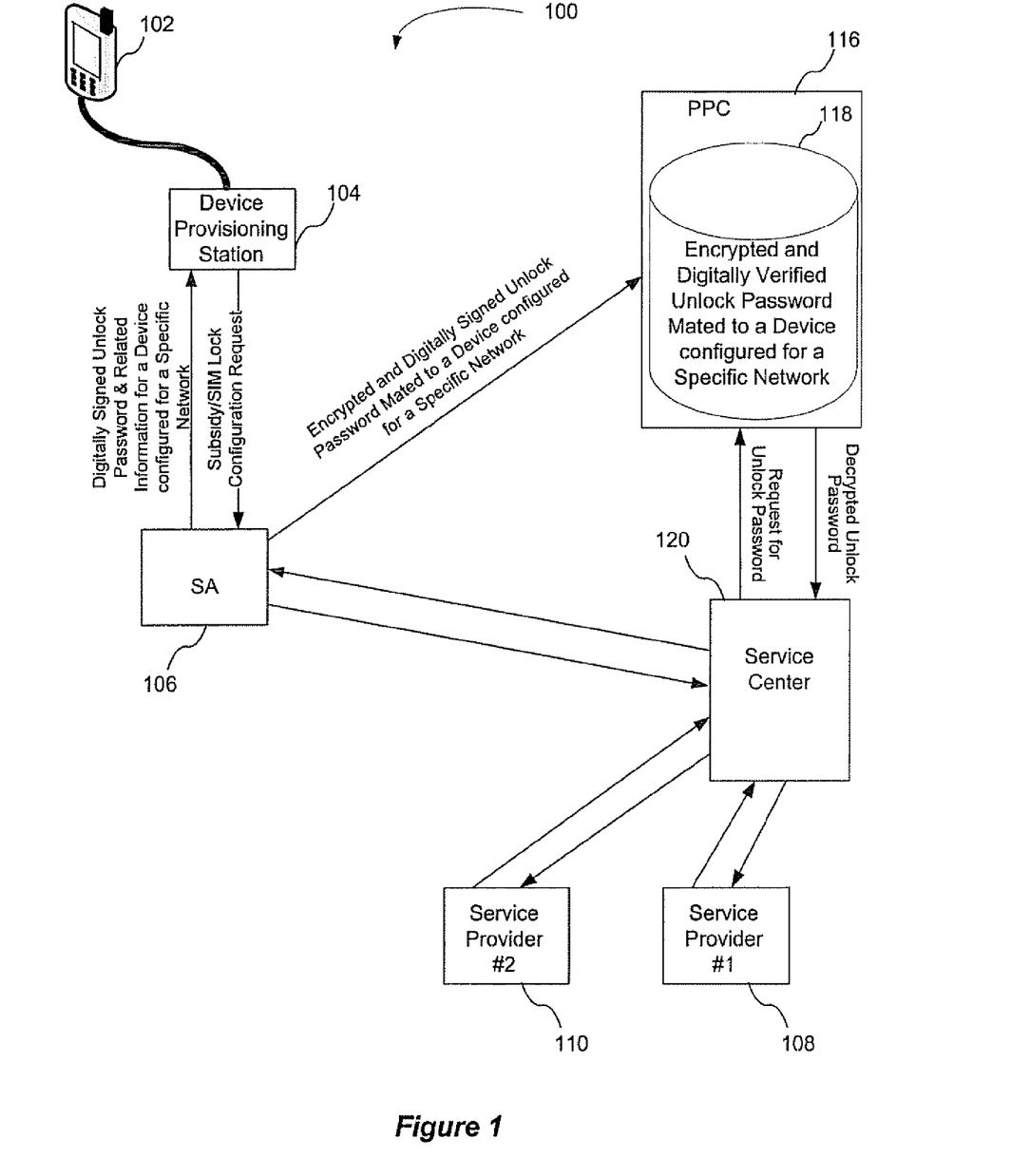
FIG. 1 illustrates an environment that provides secure generation of an unlock password for a communication device.

FIG. 1 illustrates an environment 100 that provides secure generation of an unlock password for a communication device 102. In one embodiment, a security agent ("SA") 106, which may include one or more factory server applications, communicates with one or more provisioning stations 104. As an example, the SA 106 and the provisioning station 104 may be situated in a factory location that manufactures the communication device 102. The SA 106 and the one or more provisioning stations 104 may also communicate with one another remotely in various factory locations. Further, one or more communication devices 102 may be connected to the provisioning station 104 so that the provisioning station may provision, i.e., personalize, the one or more communication devices 102 with the unlock password that is unique to each device. The term provisioning does not necessary mean that the unlock password is stored in the communication device 102. For instance, in one embodiment, the unlock password may be utilized as part of a calculation that unlocks the communication device 102. The SA 106 encrypts and digitally signs an unlock password for a device configured for a specific network. The network may be operated by one or a plurality of service providers, e.g., a first service provider 108 or a second service provider 110. In addition, the SA 106 mates the digitally signed unlock password to a specific device for the particular service provider operating the network. The SA 106 then sends the encrypted and digitally signed unlock password configured for the specific network to a PPC 116, which stores the encrypted and digitally verified unlock password mated to the device configured for a specific network in a storage medium 118.

A number of possible requests may be made by a service provider 108 to a service center 120. In one scenario, the first service provider 108 may be the customer service department of a network operator that has sold devices locked to that network configuration. A customer who has completed the terms of their contract may call the first service provider 108 to request the unlock password to remove the lock to that network configuration. The first service provider 108 sends an unlock request to the service center 120, which may be an authorized secure web interface provided by a server operated by the device manufacturer. The service center 120 requests the unlock password from the PPC 116, which may retrieve the encrypted and digitally verified unlock password mated to the device configured for the specific network. Further, the PPC 116 may decrypt the encrypted unlock password mated to the device configured for the specific network and send the unlock password to the first service center 120. As a result, the service center 120 may send the unlock password to the service provider 108 so that it can be provided to the customer to enter into the communication device 102 to unlock the communication device 102.

In another scenario, a customer may return a device to an authorized service center which may swap it for a refurbished device. The returned device is repaired and put into inventory to be swapped out for the next returned device. Because the returned device may be configured for a different network operator than the refurbished device in inventory, the refurbished device may need to be reconfigured to a different network before giving it to the customer. In such a scenario, the second service provider 110 may be a repair facility authorized by the device manufacturer to make such a repair. The second service provider 110 must first set the identity of the refurbished device to that of the returned device. Afterwards, the second service provider 110 receives a datablock signing request containing subsidy lock configuration information from the refurbished device, which it sends to the service center 120. Again, the service center 120 may be an authenticated secure web interface on a server operated by the device manufacturer. In this scenario, it may be desirable to retain the same password the customer previously had. Therefore, the service center 120 may request the password from the PPC 116, which may retrieve the encrypted and digitally verified unlock password mated to the device configured for the specific network. Further, the PPC 116 may decrypt the encrypted unlock password mated to the device configured for the specific network and send the unlock password to the service center 120. The service center 120 then sends the subsidy lock configuration request and password to the SA 106. The SA digitally signs the unlock password and related information from the subsidy lock configuration request to produce a signature of the unlock password and associated information, which is returned to the service center 120. The service center 120 then returns it to the service provider 110, which installs it into the device.

Accordingly, a layered and compartmentalized approach is provided where each party has a different security responsibility. Each component of the configuration 100 would have to be compromised in order for an attacker to obtain the unlock password. This in contrast to the previous approach in which only the 106 SA had a limited security responsibility for password protection, not the communication device 102, the device provisioning station 104, or the PPC 118.

The SA 104 and the PPC 116 each have a separate set of responsibilities. For instance, the SA 106 may only generate, encrypt, digitally sign, and mate unlock passwords to a communication device 102. Further, the SA 104 is the only entity that may perform these responsibilities. In addition, the PPC 116 may only decrypt the encrypted password record and verify the signed unlock password mated to a device configured for a specific network. The PPC 116 is the only entity that may perform these responsibilities. The assignment of exclusive responsibilities to different entities assures that a compromise of a single entity does not lead to a security threat. The assignment of these exclusive responsibilities may be implemented in the configurations described in FIG. 2 and FIG. 3.

Figure 2:
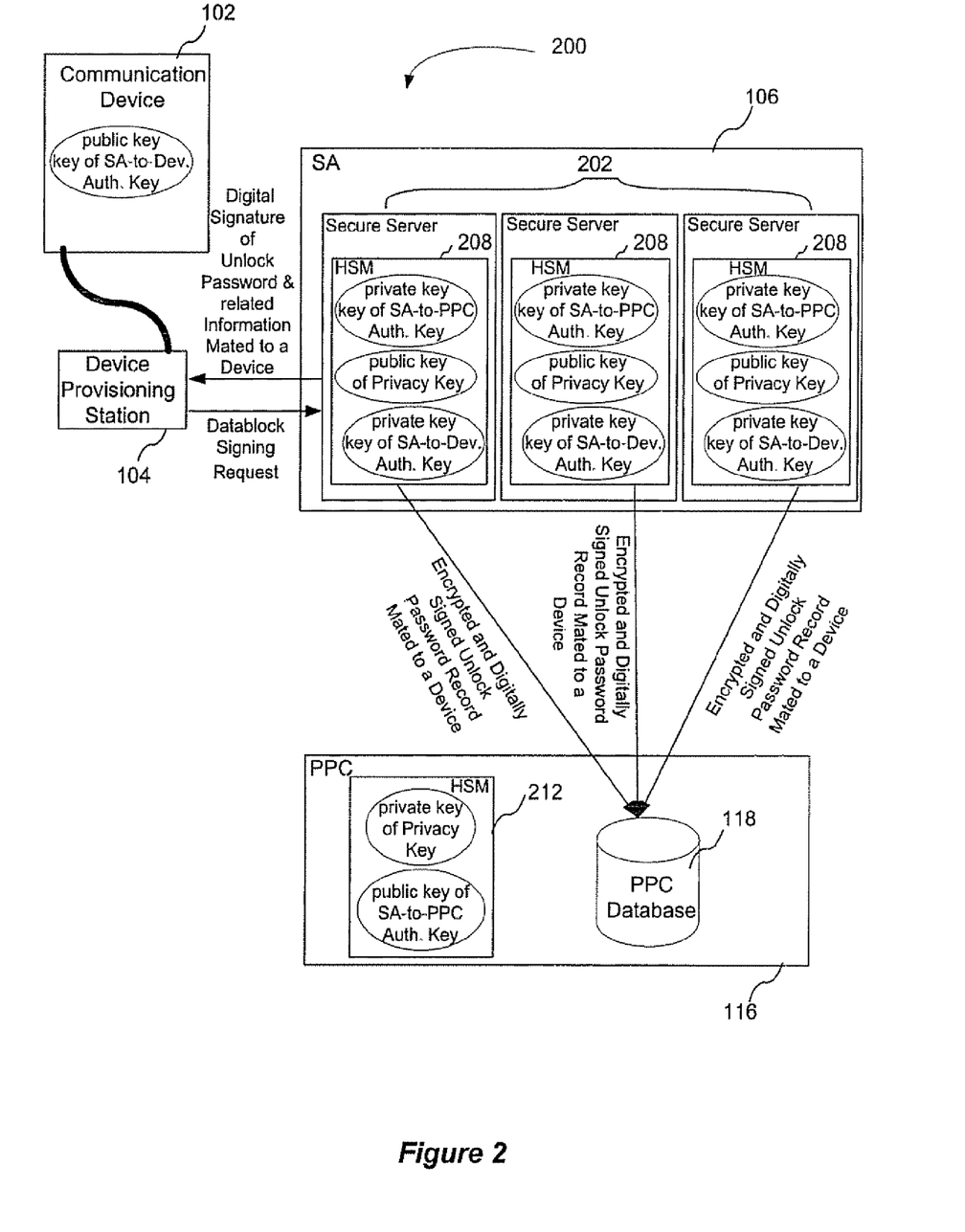
FIG. 2 illustrates a configuration that may be utilized for the environment shown in FIG. 1.

FIG. 2 illustrates a configuration 200 that may be utilized for the environment 100 shown in FIG. 1. The configuration 200 has the SA 106, which may include a plurality of secure servers 202, e.g., Public Key Infrastructure ("PKI") servers, that generate unlock passwords. After receiving a data block signing request, which may include device information, e.g., International Mobile Equipment Identity ("IMEI") and processor ID of the communication device 102, a nonce for replay prevention, and network carrier information such as the subsidy lock state and related information designating the allowed network, from the device provisioning station 104, the secure server in the plurality of secure servers in the SA 202 digitally signs the unlock password bound to the device 102 with the private key of the SA-to-Device authentication key. The SA 106 then sends the digital signature of the unlock password bound to the device 102 to the device provisioning station 104, which provisions the device 102.

Further, the SA 106 encrypts, with the public key of the Privacy key, and digitally signs, with the private key of the SA-to-PPC Authentication Key, the unlock password bound to the device 102. The SA 106 then sends the encrypted and digitally signed unlock password bound to the device 102 to the PPC 116. The encryption key that is utilized to provide password encryption is denoted as the Privacy Key. Each of the secure servers in the plurality of secure servers 208 in the SA 202 may send the record, for the unlock password which is encrypted by the public key of the Privacy Key and is also separately signed by a different authentication key, i.e., the private key of the SA-to-PPC Authentication Key, to the PPC database 118 for storage by the PPC 116. The public key of the Privacy Key is loaded into a Hardware Security Module ("HSM") 208 of each secure server in the plurality of the secure servers 202 in the SA 106. Further, the private key of the Privacy Key is loaded to a HSM 212 located in the PPC 206. In one embodiment, the same encryption key is utilized by all the secure servers in the plurality of secure servers 202. The private keys of the two Authentication Keys are loaded into the HSM 208 of each of secure servers in the plurality of secure servers 202. Further, the public key of the SA-to-PPC Authentication Key is loaded into the HSM 212 at the PPC 206, and the public key of the SA-to-Device Authentication Key is embedded in each of the respective communication devices 102. An expanded view of the communication device 102 is provided to illustrate that the public key of the SA-to-Device Authentication key is embedded in the communication device 102.

The message sent to the PPC 116 includes the encrypted and digitally signed unlock password that was previously. In other words, the unlock password, which is sent to the PPC 116, is already mated to a specific communication device 102. The device information, e.g., Device ID (which could include IMEI, processor ID, etc.) and the network carrier information, e.g., Carrier ID are also encrypted along with the unlock password. In addition, those fields are redundantly included in the message in clear. When the PPC 116 receives a password message from a factory secure server, the PPC 116 only verifies the signature and will not perform the decryption of the password. The password is decrypted upon receiving a request for the unlock password. In one embodiment, the request may be a repair request or a network change request from the service center 120. The PPC 116 may decrypt the message to retrieve the Device ID and the Carrier ID in order to make a comparison with the unencrypted Device ID and Carrier ID in the message. If there is a match, the authenticity of the mating is verified by the PPC 116, which indicates that the encrypted password received was decrypted correctly for an intended communication device 102 for an intended service provider.

As a result, the PPC 116 may authenticate that the unlock password came from the plurality of secure servers 202 in the SA 202 by utilizing the public key of the SA-to-PPC Authentication Key. A communication device 102 may also authenticate that the unlock password came from one of the plurality of secure servers 202 by utilizing the public key of the Server-to-Device Authentication Key.

Figure 3:
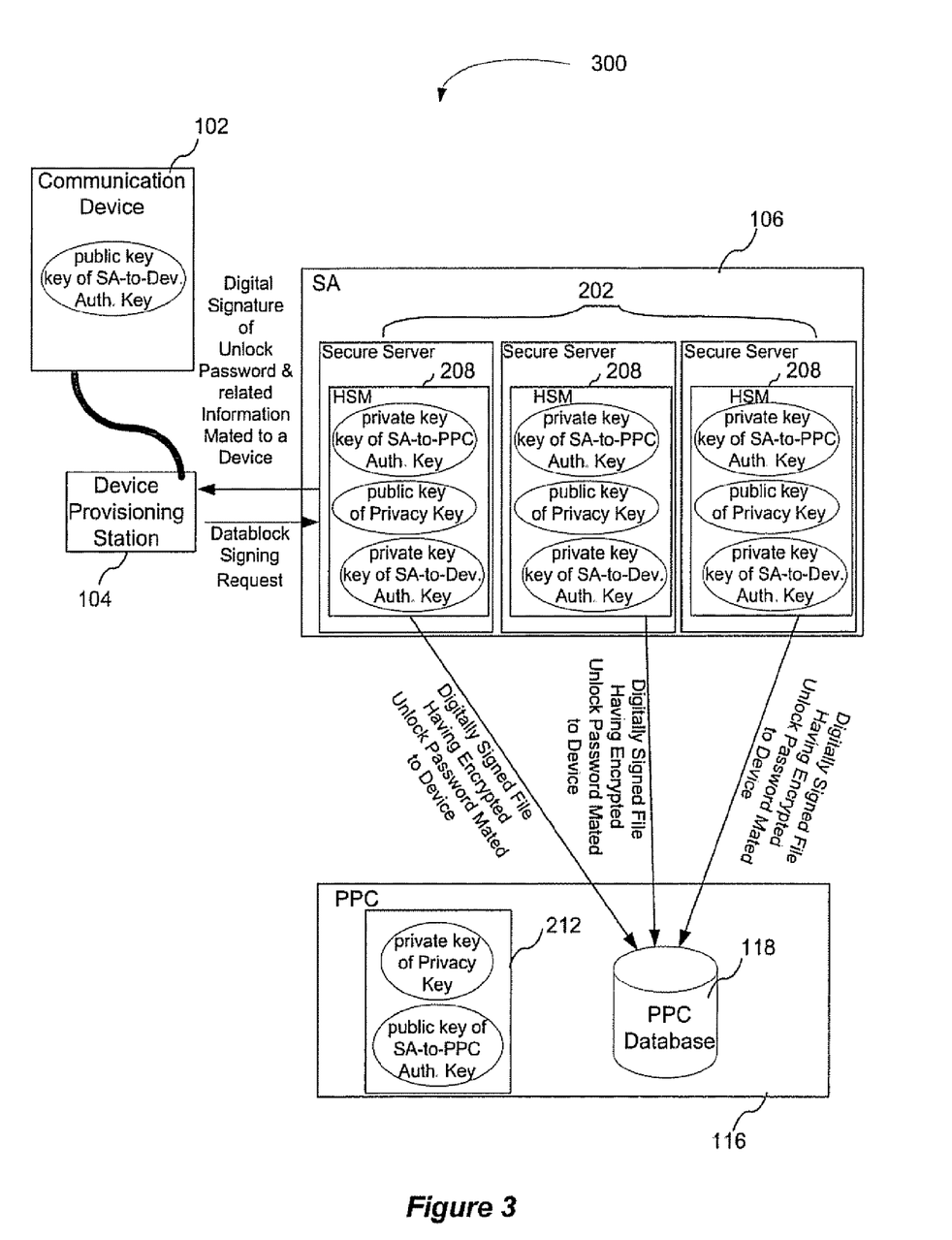
FIG. 3 illustrates an alternative configuration that may be utilized for the environment shown in FIG. 1.

FIG. 3 illustrates an alternative configuration 300 that may be utilized for the environment 100 shown in FIG. 1. In contrast to the configuration 200 shown in FIG. 2, each of the secure servers in the plurality of secure servers 202 in the configuration 300 creates a file having the one or more encrypted and unlock passwords bound to one or more devices, a file signature, and a timestamp. The file is digitally signed. As a result, the SA 106 may enhance performance by conducting signing, which is a slow cryptographic operation, only once over a single file as opposed to multiple records. Further, the PPC 116 only needs to perform a single authentication for the file as opposed to multiple authentications for each of the records having unlock passwords. The encryption and decryption operations are still performed for each password record similar to the scenario described in the configuration 200 shown in FIG. 2, However, the slow decryption operation performed by the PPC 116 only occurs when a request for the unlock password is received, which is the same as described in the configuration 200 shown in FIG. 2.

Figure 4:
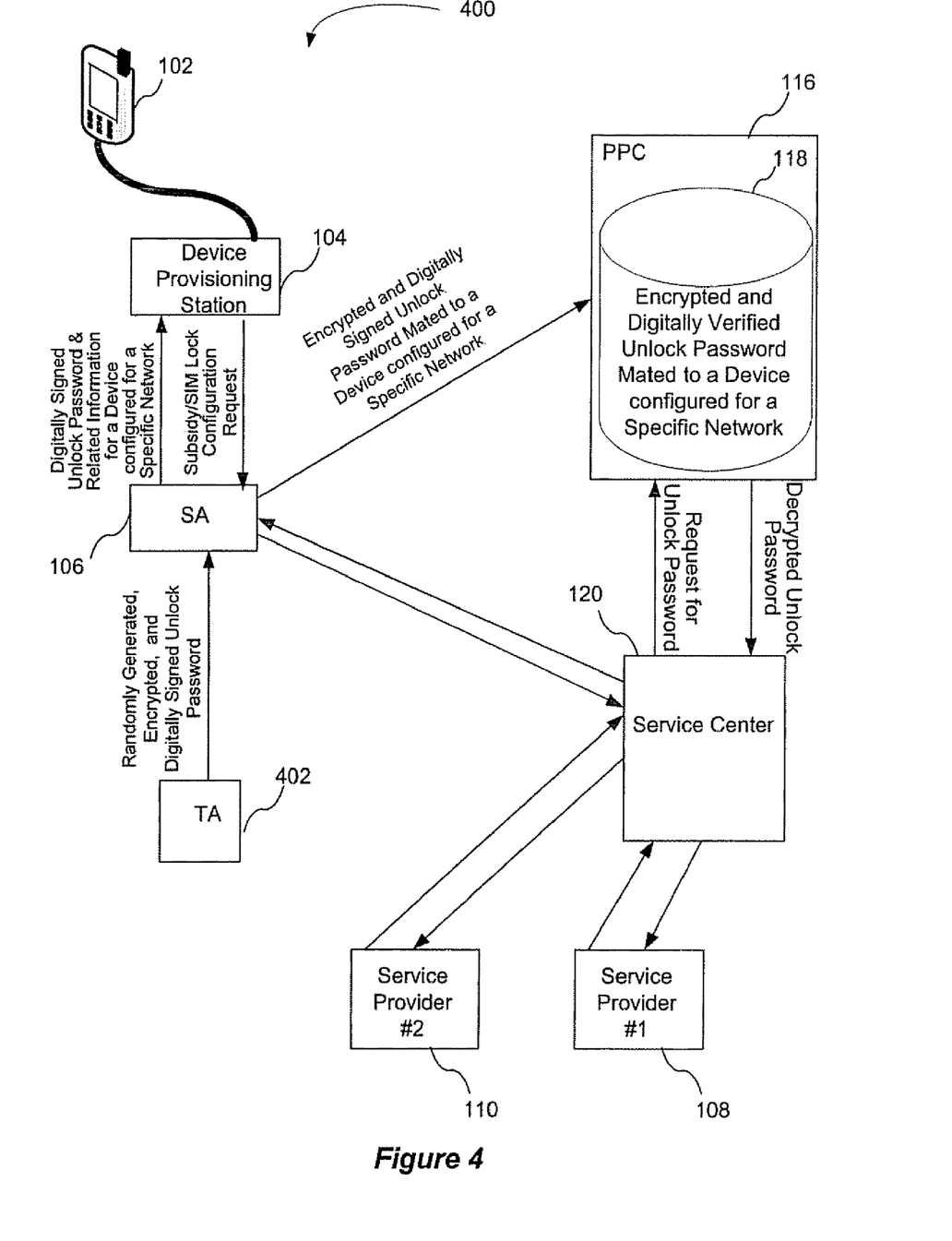
FIG. 4 illustrates an alternative environment that provides secure generation of an unlock password for a communication device.

FIG. 4 illustrates an alternative environment 400 that provides secure generation of an unlock password for a communication device 102. In contrast to the environment 100 shown in FIG. 1, the environment 400 has a trusted authority ("TA") 402 that randomly generates, encrypts, and digitally signs the unlock password. When encrypting an unlock password, the TA 402 encrypts a unique TA record identifier, i.e., TA_URI, with the unlock password. In addition, a clear field in TA_URI is also redundantly provided in the message sent from the TA 402 to the SA 106. The TA 402 then sends a message to the SA 106 that includes the randomly generated, encrypted, and digitally signed unlock password. The message also includes the TA_URI. Further, the message includes a separate hash value of the unlock password. The separate hash value of the unlock password is utilized by the SA 106 to generate a different signature for the communication device 102 to verify the unlock password message. The signature generated by the TA 402 is for the PPC 116 to verify to make sure that the unlock password was generated by the TA 402 and has not been tampered during its transmission from the TA 402 to the SA 106 and then from the SA 106 to the PPC 116. Further, based on the password request received from the device provisioning station 104, which contains the device ID and Carrier ID, the SA 106 sends the pre-generated and digitally signed unlock password for a device configured for a specific network to the device provisioning station 104 so that the communication device 102 may be provisioned. The SA 106 then mates the pre-generated password to a communication device 102. The SA 106 creates the mating value by hashing the device ID with the TA_URI together. The SA 106 then sends the mated randomly pre-generated, encrypted, and digitally signed unlock password for a device configured for a specific network to the PPC 116.

The TA 402, the SA 104, and the PPC 116 each have a separate set of exclusive responsibilities. For instance, the TA 402 may only generate, encrypt, and digitally sign unlock passwords. Further, the TA 402 is the only entity that may perform these responsibilities. In addition, the SA 106 may only mate the randomly generated, unlock password for a device configured for a specific network, send the digital signature of the unlock password to a device provisioning station operably connected to the communication device 102, and send the encrypted and digitally signed unlock password mated to the communication device configured for a specific network to the PPC 116. The SA 106 is the only entity that may perform this responsibility. Further, the PPC 116, upon receiving a request for the unlock password, may only decrypt the encrypted password record, and verify the signed unlock password mated to a device configured for a specific network. The PPC 116 is the only entity that may perform these responsibilities. The assignment of exclusive responsibilities to different entities assures that a compromise of a single entity does not lead to a security threat. The assignment of these exclusive responsibilities may be implemented in the configurations described in FIG. 5 and FIG. 6.

Figure 5:
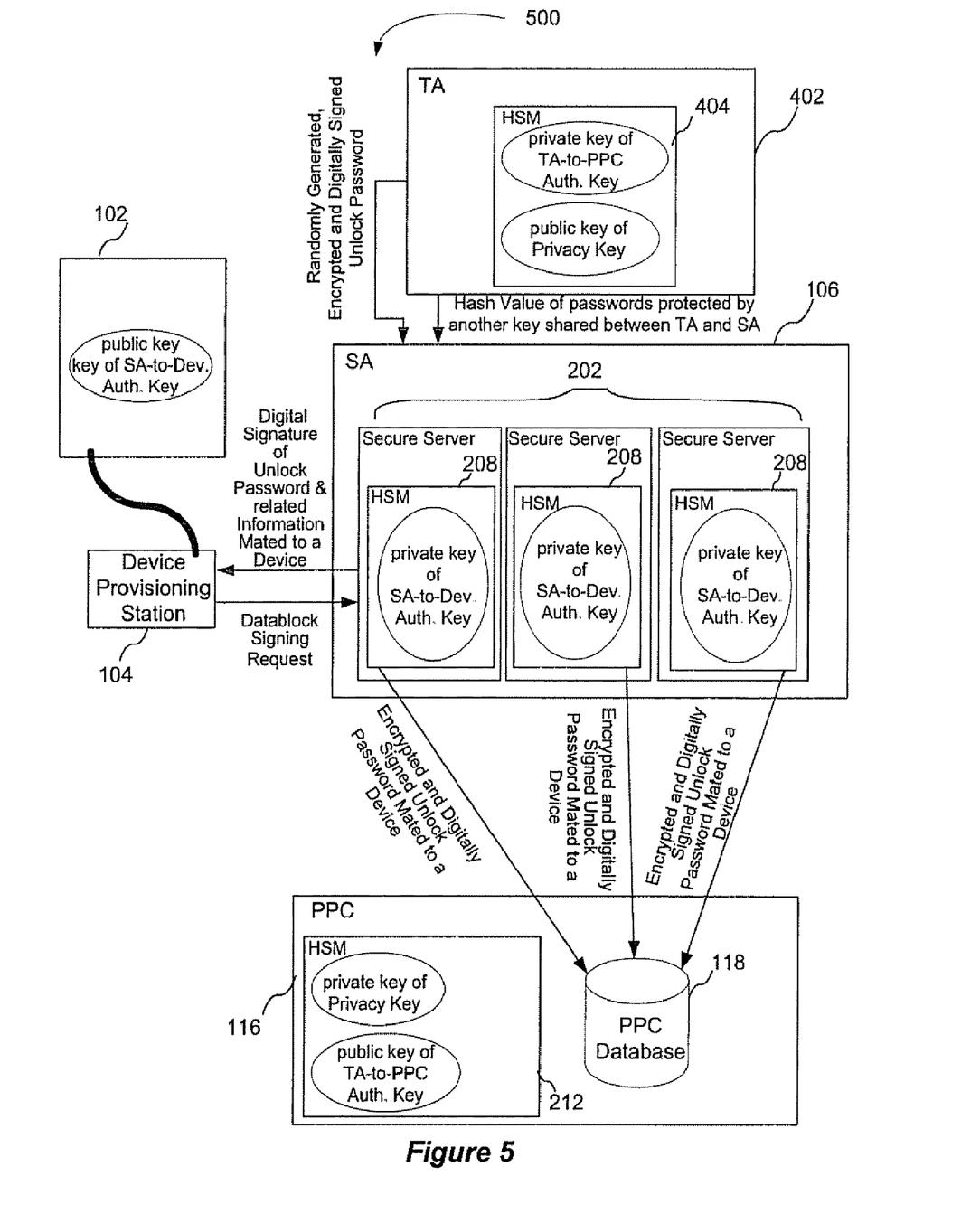
FIG. 5 illustrates a configuration that may be utilized for the environment shown in FIG. 4.

FIG. 5 illustrates a configuration 500 that may be utilized for the environment 400 shown in FIG. 4. The configuration 500 has the TA 402 with an HSM 404 that stores the private key of the Authentication Key, which is denoted as TA-to-PPC Auth. Key utilized for the PPC 116 to authenticate that the password message is generated by the TA 402, and the public key of the privacy key utilized for password encryption. Accordingly, the TA 402 randomly generates an unlock password, encrypts the unlock password with the public key of the Privacy Key along with a TA_URI, and digitally signs the unlock password with the private key of the TA-to-PPC Authentication Key. The TA 402 then sends the encrypted and digitally signed unlock password to the SA 106. Further the TA 402 sends a hash value, which results from the utilization of a one-way function on the unlock password, to the SA 106. In one embodiment, the TA 402 and one of the secure servers in the plurality of secure servers 202 may share an encryption key that encrypts and decrypts the encrypted hash value as exposure of the hash value may lead to generating a valid unlock code message to unlock the communication device 102. Based on the password request received from a device provisioning station 104, which contains the device ID and Carrier ID, the SA 106 digitally signs the hash value of the password received from the TA 402 utilizing the private key of SA-to-Device authentication key, and then sends the signature of the password to the provisioning station 104 so that the communication device 102 may be provisioned with the unlock password signature. In addition, the SA 106 mates the randomly generated password to a communication device 102. The SA 106 generates a password-device mating value by hashing the device ID with the TA_URI of the TA 402. The secure server in the plurality of secure servers 202 then sends the encrypted and digitally signed unlock password generated by the TA 402 along with the mating value to the PPC 116 generated by the SA 106. The PPC 116 first utilizes the public key of the TA-to-PPC Authentication Key to authenticate the digital signature before storing the encrypted password to the PPC database 118. Subsequently, when a request for the unlock password is received, the PPC 116 utilizes the private key of the Privacy Key stored in the HSM 212 to decrypt the encrypted unlock password as well as the unique TA_URI. Further, the PPC 116 determines if the mating value received from the SA 106 in clear matches with the one that is re-computed from the value of TA_URI decrypted in above decryption operation and the device information received from the SA 202. If a match exists, the unlock password record received from SA 106 is deemed to have been securely transmitted from the TA 402 to the SA 106 to the PPC 116, and the encrypted password record was decrypted for an intended communication device 102. The choice of utilizing a public key or a private key when needed by a system component in the configuration 500 is made to ensure an optimal balance between security and performance.

Figure 6:
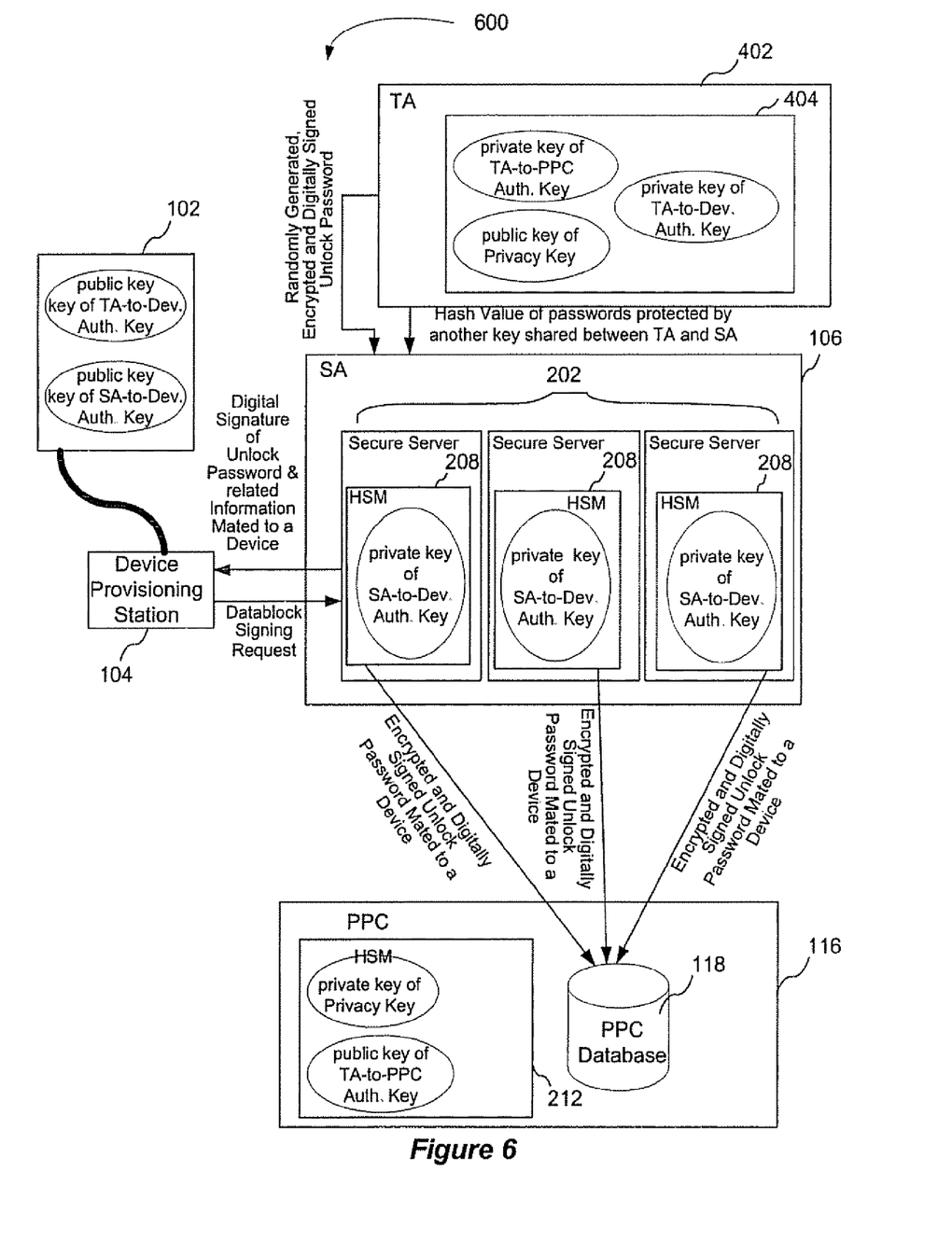
FIG. 6 illustrates an alternative configuration that may be utilized for the environment shown in FIG. 4.

FIG. 6 illustrates an alternative configuration 600 that may be utilized for the environment 400 shown in FIG. 4. In contrast to the configuration 500 shown in FIG. 5, the configuration 600 stores a private key of a TA-to-Device Authentication Key in the TA 402. Accordingly, the TA 402 prepares two messages, or one message with two subparts, having the unlock password. The first message, or first subpart, includes the hash value of the password along with a digital signature signed with the private key of the TA-to-Device Authentication Key. The first message, or first subpart, is then sent to the SA 106, which generates another signature based on the hash value of the password received from the TA 402 along with some specific device and network carrier information based on a request message that the SA 106 received from a device provisioning station 104. The SA 106 sends this doubly signed password message to the provisioning station 104, which loads the doubly signed password message to the communication device 102. Further, the communication device 102 has the public key of the TA-to-Device Authentication Key and the public key of the SA-to-Device Authentication Key. Accordingly, the communication device 102 can authenticate both the digital signatures signed by the TA 402 and the digital signature signed by the SA 106. The second message, or second subpart, includes a digital signature with the private key of the TA-to-PPC Authentication Key, as discussed with respect to the configuration 500 shown in FIG. 5. Accordingly, the digital signature for the second message, or second subpart, is authenticated in a similar manner to that of the configuration 500 shown in FIG. 5.

The utilization of the TA-to-Device Authentication Key provides an additional signature to ensure that the unlock password is generated by the TA 402, not the SA 106. This signature is verifiable only by the communication device 102 that has the public verification key embedded in its firmware code. The configuration 600 enhances the system security since an attacker may attempt to break or obtain access to the secure server in the plurality of secures servers 202, reverse engineer the existing application of the secure server in the plurality of secure servers 202 to retrieve the password of the HSM 208 in one the secure servers in the plurality of secure servers 202 in order to access the HSM 208, or write an application to reuse the system to generate the password with access to the HSM 208 of the secure server. Since the plurality of secure servers 202 may distributed amongst a plurality of factor sites, a pirate could potentially have multiple access points. An HSM 208 can only ensure that the key cannot be extracted and has very limited control over its use (protected by a password). The hash of the password could be utilized by a pirate to sign locally-generated unlock passwords. The counter-argument to the possible re-use of the secure server in the plurality of the secure servers 202 is that the unlock message also has a signature that is calculated using the private key of TA-to-PPC Authentication Key stored only in the TA 402 and is verified by the PPC 116. Therefore, the PPC 116 would reject the signed password as being invalid since it verifies a signature using its public key. However, this is irrelevant to the attacker as the communication devices 102 will already have been manufactured and the attacker knows the unlock passwords for all the handsets. The after-manufacture storing of encrypted passwords in the PPC 116 is only for use by service providers. By having the communication device 102 verify that the message not only came from a SA 106 and that the generated password was signed by a key generated only in the TA 402, the communication device 102 is then assured of a higher level of security for the unlock password. The attack vector then moves to the handset firmware, turning off the verification of the TA-generated signature. This would be a much harder attack as it would require changing the firmware used in a production environment at a factory.

Accordingly, the configuration 500 and the configuration 600 provide a secure approach. The different implementation choices, various ways to configure systems, and methods to use public/private keys are carefully designed in order to ensure the optimal balance between security and performance. The password data is considered as secure personalization data that is generated in an isolated secure TA 402. Before distribution to an online system, the password data is encrypted and signed. Each password record is then assigned and mated to a phone during manufacturing time. The mating value along with encrypted password and signature will be uploaded to the PPC 116, which is the primary repository of the attributes for a mobile device. The PPC 116 will first verify that an unlock password is generated by a TA, and then decrypt the unlock password when needed. The mating value will also be validated to make sure the mating value is assigned to a specific device. A plurality of keys are defined in the process to encrypt and authenticate password. Keys with its corresponding operations are carefully arranged to be used at the right time to achieve the best performance result. Furthermore, the private signing key and decryption key along with their operations are protected and contained only within centralized secure locations where security resources are available to maintain a very high level of security. Accordingly, a layered and compartmentalized approach is also provided in this configuration so that each party has a different security responsibility.

The configuration 500 shown in FIG. 5 and the configuration 600 shown in FIG. 6 provide password generation, encryption, and signing operations for the PPC 116 that are completely off loaded from the SA 106 and can be pre-generated before manufacturing time, which improves performance significantly. Accordingly, the HSMs 208 of the SA 106 in the plurality of secure servers 202, some of which may already be deployed in the field, do not have to be re-personalized. Further, the security of password handling is enhanced because the TA 402 is an offline secure system with restricted access as opposed to the plurality of secure servers 202, which are widely distributed at multiple factory locations.

Figure 7:
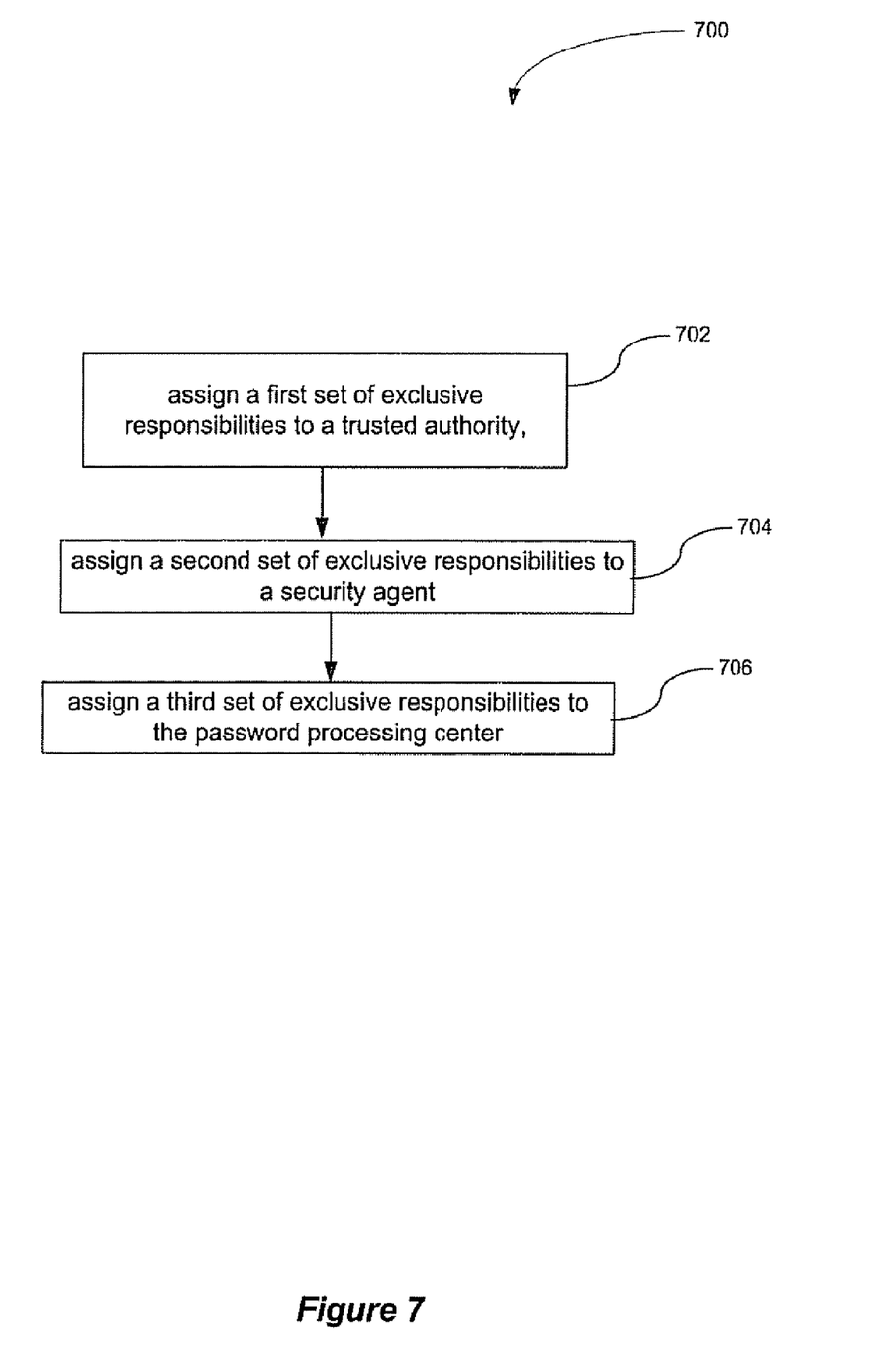
FIG. 7 illustrates a process that may be utilized for securing unlock password generation.

FIG. 7 illustrates a process 700 that may be utilized for securing unlock password generation. At a process block 702, the process 700 assigns a first set of exclusive responsibilities to a TA 402. The first set of exclusive responsibilities includes random generation, encryption, and digital signing of an unlock password to compose a randomly generated and encrypted unlock password having a digital signature. Further, at a second process block 704, the process 700 assigns a second set of exclusive responsibility to an SA 106. The second set of exclusive responsibilities includes receiving the randomly generated and encrypted unlock password with a first digital signature from the trusted authority, digitally signing information associated with the unlock password with a second digital signature, sending the second digital signature and the information associated with the unlock password to a communication device configured for a network in order to mate the unlock password to the communication device, and sending the randomly generated and encrypted unlock password having the first digital signature along with mating data to the PPC 116. In one embodiment, the information associated with the unlock password may be a hash of the unlock password. In addition, at a process block 706, the process 700 assigns a third set of exclusive responsibilities to the PPC 116. The third set of exclusive responsibilities includes, upon receipt of a request for the unlock password, verifying the first digital signature, decrypting the randomly generated and encrypted unlock password, and verifying, based upon the mating data, that the unlock password is mated to the communication device 102.

In an alternative embodiment, at the process block 702, the first set of exclusive responsibilities includes random generation and encryption of an unlock password to compose a randomly generated encrypted unlock password. Further, in the alternative embodiment, at the process block 704, the second set of exclusive responsibilities includes sending information associated with the unlock password and a digital signature of information associated with the unlock password to a communication device configured for a network in order to mate the unlock password to the communication device, and sending the randomly generated and encrypted unlock password along with mating data to a PPC 116. In one embodiment, the information associated with the unlock password may be a hash of the unlock password. In addition, in the alternative embodiment, at the process block 706, the third set of exclusive responsibilities includes decrypting the randomly generated and encrypted unlock password.

Figure 8:
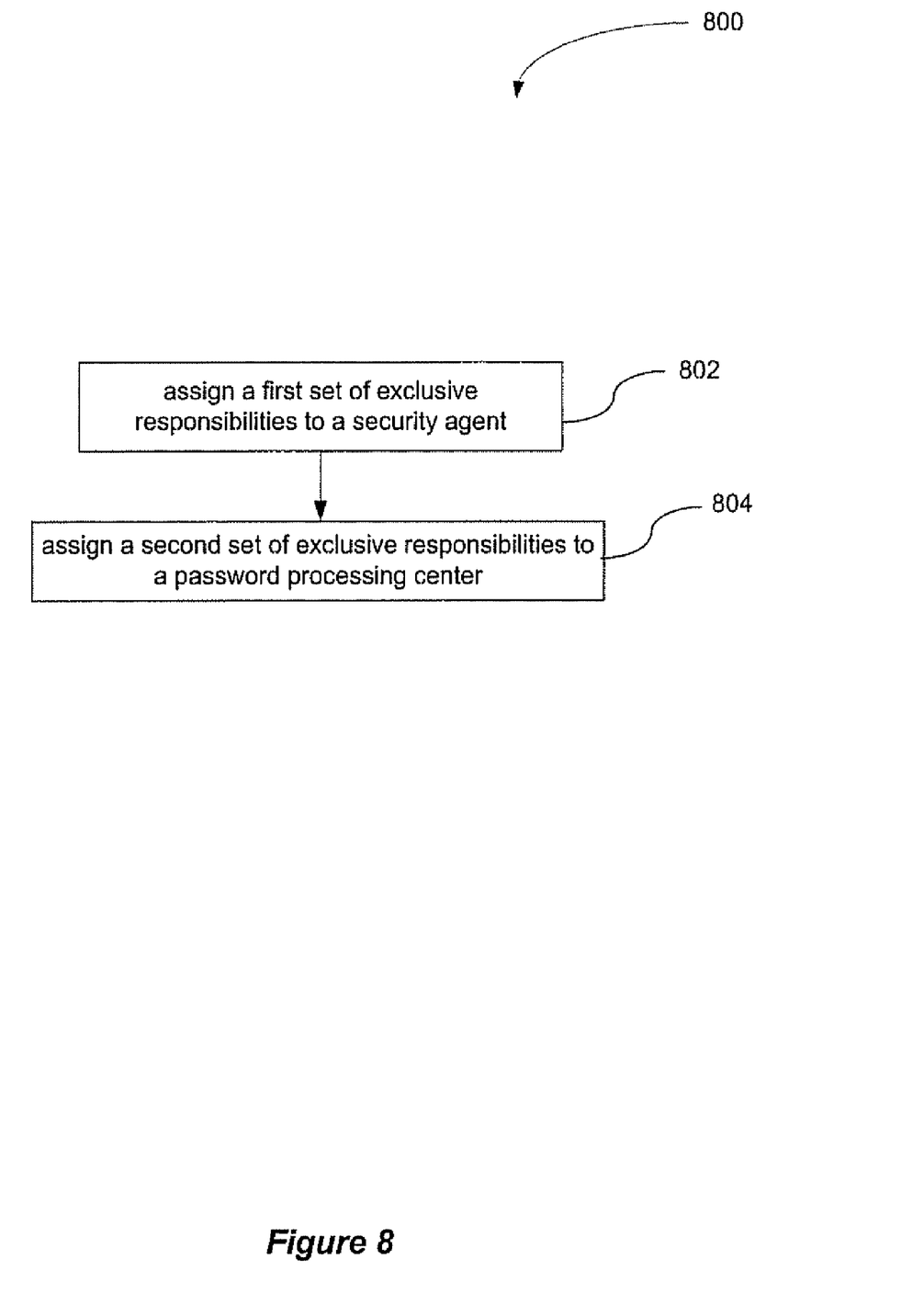
FIG. 8 illustrates another process that may be utilized for securing unlock password generation.

FIG. 8 illustrates another process 800 that may be utilized for securing unlock password generation. At a process block 802, the process 800 assigns a first set of exclusive responsibilities to an SA 106. The first set of exclusive responsibilities includes random generation, encryption, and digital signing of an unlock password to compose a randomly generated and encrypted unlock password having a digital signature, sending the digital signature and information associated with the unlock password to a communication device configured for a network in order to mate the unlock password to the communication device, and sending the randomly generated and encrypted unlock password having the digital signature along with mating data to a PPC 116. Further, at a process block 804, the process 800 assigns a second set of exclusive responsibilities to the PPC 116. The second set of exclusive responsibilities includes, upon receipt of a request for the unlock password, verifying the digital signature, decrypting the randomly generated and encrypted unlock password decrypting the mated, randomly generated, and encrypted unlock password, and verifying, based upon the mating data, that the unlock password is mated to the communication device.

Figure 9:
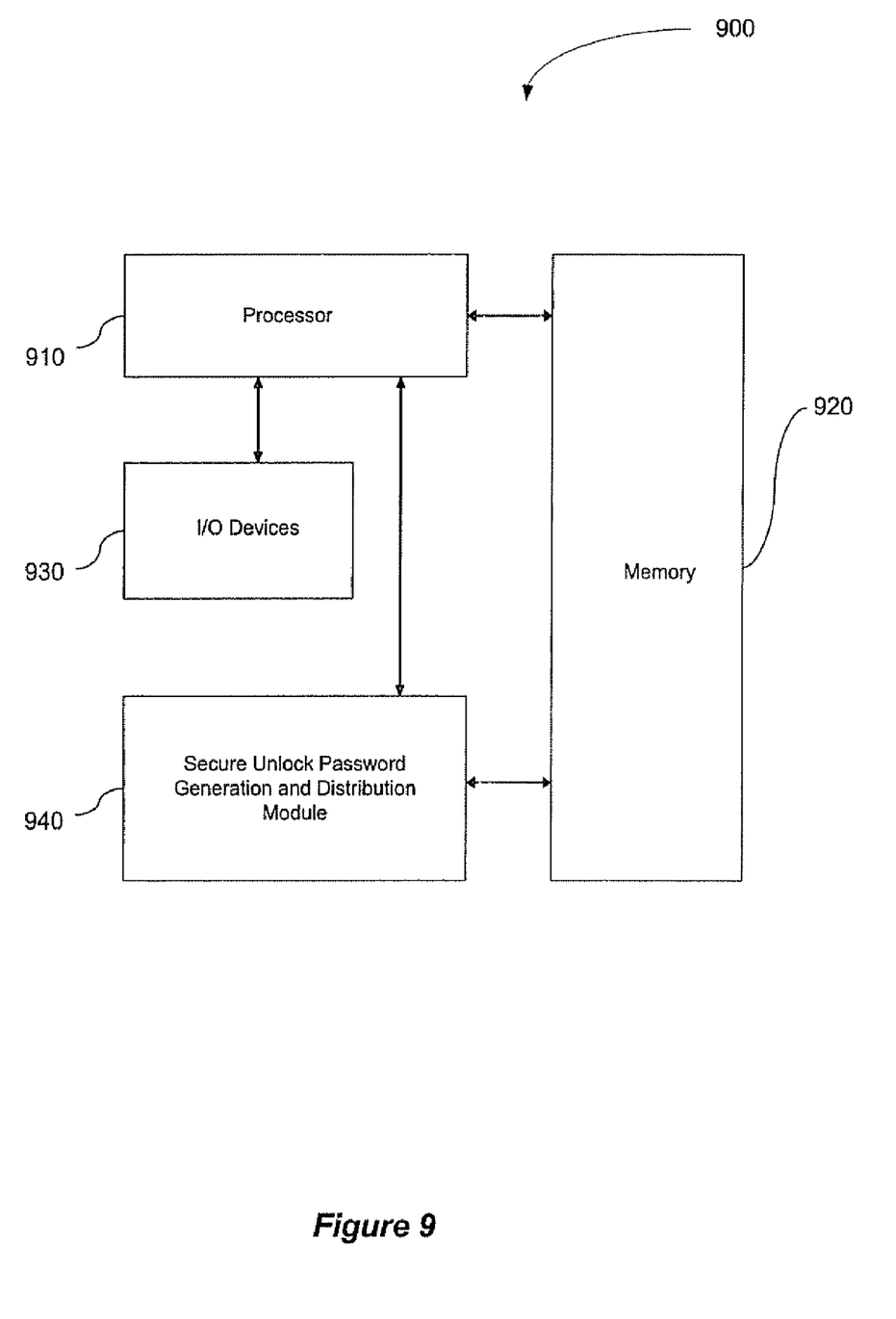
FIG. 9 illustrates a block diagram of a station or system that implements secure unlock password generation and distribution.

FIG. 9 illustrates a block diagram of a station or system 900 that implements secure unlock password generation and distribution. In one embodiment, the station or system 900 is implemented using a general purpose computer or any other hardware equivalents. Thus, the station or system 900 comprises a processor 910, a memory 920, e.g., random access memory ("RAM") and/or read only memory ("ROM"), a secure unlock password generation and distribution module 940, and various input/output devices 930, (e.g., storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands), and other HSMs.

It should be understood that the secure unlock password generation and distribution module 940 may be implemented as one or more physical devices that are coupled to the processor 910 through a communication channel. Alternatively, the secure unlock password generation and distribution module 940 may be represented by one or more software applications (or even a combination of software and hardware, e.g., using application specific integrated circuits (ASIC)), where the software is loaded from a storage medium, (e.g., a magnetic or optical drive or diskette) and operated by the processor in the memory 920 of the computer. As such, the secure unlock password generation and distribution module 940 (including associated data structures) of the present invention may be stored on a computer readable medium, e.g., RAM memory, magnetic or optical drive or diskette and the like.

It is understood that the secure unlock password generation and distribution described herein may also be applied in other types of systems. Those skilled in the art will appreciate that the various adaptations and modifications of the embodiments of this method and apparatus may be configured without departing from the scope and spirit of the present method and system. Therefore, it is to be understood that, within the scope of the appended claims, the present method and apparatus may be practiced other than as specifically described herein.

We claim:

1. A method comprising:
   in a security agent comprising one or more secure servers:
   receiving, from a trusted authority having a first set of responsibilities, a randomly generated and encrypted unlock password having a first digital signature, wherein the first set of responsibilities comprises random generation, encryption, and digital signing of an unlock password to compose the randomly generated and encrypted unlock password having the first digital signature;
   digitally signing information associated with the unlock password to create a second digital signature;
   sending the second digital signature and the information associated with the unlock password to a communication device configured for a network in order to mate the unlock password to the communication device; and
   sending, to a password processing center having a third set of responsibilities, the randomly generated and encrypted unlock password having the first digital signature along with mating data;
   wherein the security agent has a second set of responsibilities that comprises the steps of receiving the randomly generated and encrypted unlock password from the trusted authority, digitally signing the information associated with the unlock password, sending the second digital signature and the information associated with the unlock password to the communication device, and sending the randomly generated and encrypted unlock password to the password processing center;
   wherein the third set of responsibilities comprises, upon receipt of a request for the unlock password, verifying the first digital signature, decrypting the randomly generated and encrypted unlock password, and verifying, based upon the mating data, that the unlock password is mated to the communication device;
   wherein the second digital signature is generated with a private key of a security agent-to-device authentication key, wherein the security agent-to-device authentication key is a key pair comprising the private key and a public key;
   wherein the communication device has a fourth set of responsibilities that comprises verifying that the second digital signature came from the security agent by authenticating the second digital signature with the public key of the security agent-to-device authentication key; and
   wherein the first, second, third, and fourth sets of responsibilities are not the same as one another.

2. The method of claim 1, wherein the trusted authority is configured to perform the encryption with a public key of a privacy key, wherein the privacy key is a key pair comprising a private key and the public key for encryption of the unlock password.

3. The method of claim 2, wherein the password processing center is configured to perform the decryption with the private key of the privacy key.

4. The method of claim 1, wherein the trusted authority is configured to perform the digital signing with a private key of a trusted authority-to-password processing center (TA-to-PPC) authentication key, wherein the TA-to-PPC authentication key is a key pair comprising the private key and a public key that can be utilized by the password processing center for authentication.

5. The method of claim 4, wherein the password processing center is configured to perform the digital signature verification with the public key of the TA-to-PPC authentication key.

6. The method of claim 1, wherein the first set of responsibilities further comprises generating an additional signature for the randomly generated and encrypted unlock password using a private key of a trusted authority-to-device (TA-to-device) authentication key, wherein the TA-to-device authentication key is a second key pair comprising the private key of the TA-to-device authentication key and a public key of the TA-to-device authentication key.

7. The method of claim 6, further comprising:
   generating a digitally signed additional signature by using the second digital signature to digitally sign the additional signature; and
   sending the digitally signed additional signature to a provisioning station so that the digitally signed additional signature is sent to the communication device;
   wherein the second set of responsibilities further comprises generating the digitally signed additional signature and sending the digitally signed additional signature to the provisioning station.

8. The method of claim 7, wherein the fourth set of responsibilities further comprises verifying the digitally signed additional signature with a public key of the security agent-to-device authentication key and the additional signature with the public key of the trusted authority-to-device authentication key.

9. A method comprising:
   in a security agent having a first set of responsibilities, and comprising one or more secure servers:
   creating a randomly generated and encrypted unlock password having a digital signature by randomly generating, encrypting, and digitally signing an unlock password;
   sending the digital signature and information associated with the unlock password to a communication device configured for a network in order to mate the unlock password to the communication device; and
   sending, to a password processing center having a second set of responsibilities, the randomly generated and encrypted unlock password having the digital signature along with mating data;
   wherein the first set of responsibilities comprises creating the randomly generated and encrypted unlock password having the digital signature, sending the digital signature and information associated with the unlock password to the communication device, and sending the randomly generated and encrypted unlock password having the digital signature along with mating data to the password processing center;
   wherein the second set of responsibilities comprises, upon receipt of a request for the unlock password, verifying the digital signature sent to the password processing center, decrypting the randomly generated and encrypted unlock password, and verifying, based upon the mating data, that the unlock password is mated to the communication device;

wherein the security agent is configured to perform the digital signing with a private key of a security agent-to-password processing center (SA-to-PPC) authentication key, wherein the SA-to-PPC authentication key is a key pair comprising the private key and a public key that can be utilized by the password processing center for authentication; and wherein the first and second sets of responsibilities are not the same as one another.

10. The method of claim 9, wherein the security agent is configured to perform the encrypting of the unlock password with a public key of a privacy key, wherein the privacy key is a key pair comprising a private key and the public key for encryption of the unlock password.

11. The method of claim 10, wherein the password processing center is configured to perform the decryption with the private key of the privacy key.

12. The method of claim 9, wherein the password processing center is configured to perform the digital signature verification with the public key of the SA-to-PPC authentication key.

13. A method comprising:
in a security agent comprising one or more secure servers:
receiving a randomly generated and encrypted unlock password composed by a trusted authority having a first set of responsibilities, wherein the first set of responsibilities comprises random generation and encryption of an unlock password to compose the randomly generated and encrypted unlock password;
sending information associated with the unlock password and a digital signature of the information associated with the unlock password to a communication device configured for a network in order to mate the unlock password to the communication device; and
sending the randomly generated and encrypted unlock password along with mating data to a password processing center having a third set of responsibilities;
wherein the security agent has a second set of responsibilities that comprises the steps of receiving the randomly generated and encrypted unlock password, sending the information associated with the unlock password and the digital signature to the communication device, and sending the randomly generated and encrypted unlock password along with the mating data to the password processing center;
wherein the third set of responsibilities comprises decrypting the randomly generated and encrypted unlock password;
wherein the communication device has a fourth set of responsibilities that comprises verifying that the digital signature of the information associated with the unlock password came from the security agent by authenticating the digital signature of the information associated with the unlock password with a public key of a security agent-to-device authentication key, wherein the security agent-to-device authentication key is a key pair comprising the public key and a private key; and
wherein the first, second, third, and fourth sets of responsibilities are not the same as one another.

14. The method of claim 13, wherein the first set of responsibilities further comprises a digital signing of the randomly generated and encrypted unlock password.

15. The method of claim 14, wherein the third set of responsibilities further comprises a verification of the digital signature of the randomly generated and encrypted unlock password to ensure that the randomly generated and encrypted unlock password was composed by the trusted authority.

16. The method of claim 14, further comprising:
digitally signing the information associated with the unlock password to create an additional signature, using a private key of a security agent-to-device authentication key, wherein the security agent-to-device authentication key is a key pair comprising the private key of the security agent-to-device authentication key and a public key of the security agent-to-device authentication key, so that the communication device is able to authenticate that the information associated with the unlock password was digitally signed both by the trusted authority and by the security agent; and
wherein the second set of responsibilities further comprises the step of digitally signing the information associated with the unlock password to create an additional signature.

17. A non-transitory computer-readable medium, comprising stored instructions which, when executed by one or more processors of a security agent comprising one or more secure servers, cause the one or more processors to perform the method of claim 1.

18. A non-transitory computer-readable medium, comprising stored instructions which, when executed by one or more processors of a security agent comprising one or more secure servers, cause the one or more processors to perform the method of claim 9.

19. A non-transitory computer-readable medium, comprising stored instructions which, when executed by one or more processors of a security agent comprising one or more secure servers, cause the one or more processors to perform the method of claim 13.

20. A system comprising:
a trusted authority having a first set of responsibilities, and comprising a first set of one or more computer processors configured to perform the first set of responsibilities;
a security agent communicatively coupled to the trusted authority, the security agent having a second set of responsibilities, and comprising a second set of one or more computer processors in one or more secure servers configured to perform the second set of responsibilities; and
a password processing center communicatively coupled to the security agent, the password processing center having a third set of responsibilities, and comprising a third set of one or more computer processors configured to perform the third set of responsibilities;
wherein the trusted authority is configured to create a randomly generated and encrypted unlock password having a first digital signature, and to send the randomly generated and encrypted unlock password to the security agent;
wherein the first set of responsibilities comprises random generation, encryption, and digital signing of an unlock password to compose a randomly generated and encrypted unlock password having a first digital signature, and sending the randomly generated and encrypted unlock password having the first digital signature to the security agent;
wherein the second set of responsibilities comprises receiving the randomly generated and encrypted unlock password from the trusted authority, digitally signing information associated with the unlock password to generate a second digital signature, sending the second digital signature and the information associated with the unlock password to the communication device, and sending the randomly generated and encrypted unlock password to the password processing center;

wherein the third set of responsibilities comprises, upon receipt of a request for the unlock password, verifying the first digital signature, decrypting the randomly generated and encrypted unlock password, and verifying, based upon a mating data, that the unlock password is mated to the communication device;

wherein the second digital signature is generated with a private key of a security agent-to-device authentication key, wherein the security agent-to-device authentication key is a key pair comprising the private key and a public key;

wherein the communication device has a fourth set of responsibilities that comprises verifying that the second digital signature came from the security agent by authenticating the second digital signature with the public key of the security agent-to-device authentication key; and wherein the first, second, third, and fourth sets of responsibilities are not the same as one another.

21. A system comprising:

a security agent having a first set of responsibilities, and comprising a first set of one or more computer processors in one or more secure servers configured to perform the first set of responsibilities; and a password processing center communicatively coupled to the security agent, the password processing center having a second set of responsibilities, and comprising a second set of one or more computer processors configured to perform the second set of responsibilities;

wherein the first set of responsibilities comprises creating a randomly generated and encrypted unlock password having a digital signature by randomly generating, encrypting, and digitally signing an unlock password; sending the digital signature and information associated with the unlock password to a communication device configured for a network in order to mate the unlock password to the communication device; and sending, to a password processing center having a second set of responsibilities, the randomly generated and encrypted unlock password having the digital signature along with mating data;

wherein the second set of responsibilities comprises, upon receipt of a request for the unlock password, verifying the digital signature sent to the password processing center, decrypting the randomly generated and encrypted unlock password, and verifying, based upon the mating data, that the unlock password is mated to the communication device;

wherein the security agent is configured to perform the digital signing with a private key of a security agent-to-password processing center (SA-to-PPC) authentication key, wherein the SA-to-PPC authentication key is a key pair comprising the private key and a public key that can be utilized by the password processing center for authentication; and wherein the first and second sets of responsibilities are not the same as one another.

22. A system comprising:

a trusted authority having a first set of responsibilities, and comprising a first set of one or more computer processors configured to perform the first set of responsibilities;

a security agent communicatively coupled to the trusted authority, the security agent having a second set of responsibilities, and comprising a second set of one or more computer processors in one or more secure servers configured to perform the second set of responsibilities; and a password processing center communicatively coupled to the security agent, the password processing center having a third set of responsibilities, and comprising a third set of one or more computer processors configured to perform the third set of responsibilities;

wherein the first set of responsibilities comprises composing a randomly generated and encrypted unlock password, and sending the randomly generated and encrypted unlock password to the security agent;

wherein the second set of responsibilities comprises receiving the randomly generated and encrypted unlock password from the trusted authority, sending information associated with the unlock password and a digital signature of the information associated with the unlock password to a communication device configured for a network in order to mate the unlock password to the communication device, and sending the randomly generated and encrypted unlock password along with mating data to the password processing center;

wherein the third set of responsibilities comprises decrypting the randomly generated and encrypted unlock password;

wherein the communication device has a fourth set of responsibilities that comprises verifying that the digital signature of the information associated with the unlock password came from the security agent by authenticating the digital signature of the information associated with the unlock password with a public key of a security agent-to-device authentication key, wherein the security agent-to-device authentication key is a key pair comprising the public key and a private key; and wherein the first, second, third, and fourth sets of responsibilities are not the same as one another.

* * * * *